March 17, 1942.    W. F. BOLDT    2,276,283
ASSEMBLING MEANS FOR BRAKE SHOE RETRACTING SPRINGS
Filed March 31, 1941
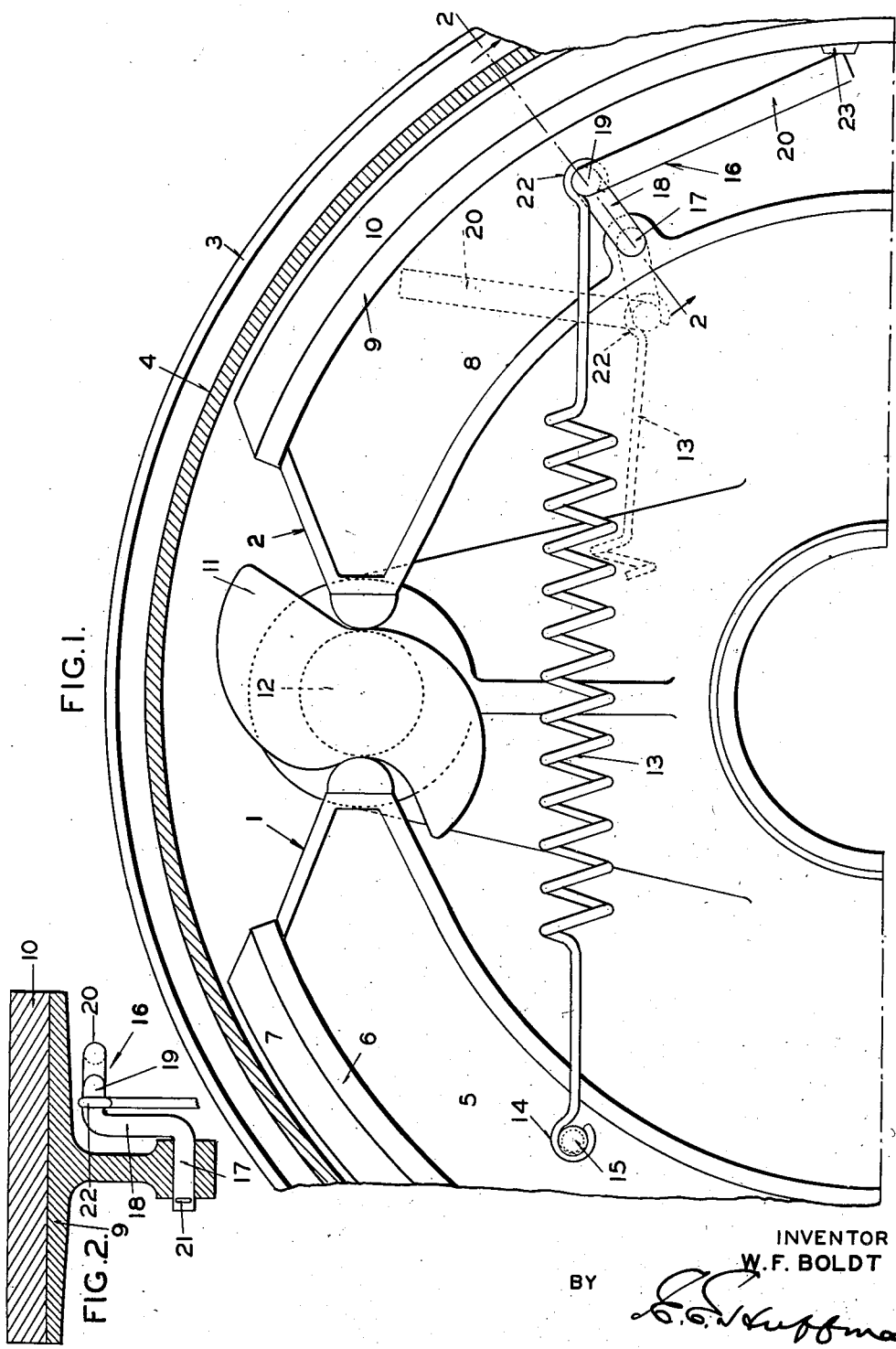
INVENTOR
W. F. BOLDT
BY
ATTORNEY Patented Mar. 17, 1942

2,276,283

UNITED STATES PATENT OFFICE 2,276,283

ASSEMBLING MEANS FOR BRAKE SHOE RETRACTING SPRINGS

Werner F. Boldt, Clayton, Mo., assignor to Wagner Electric Corporation, St. Louis, Mo., a corporation of Delaware Application March 31, 1914, Serial No. 386,000

8 Claims. (Cl. 188—78)

My invention relates to braking apparatus and more particularly to means for assembling and preloading a retracting spring for brake shoes.

One of the objects of my invention is to provide means for association with a brake shoe retracting spring which will facilitate the assembly thereof in operating condition.

Another object of my invention is to provide connecting means between a retracting spring and a brake shoe which will permit the spring to be assembled in a non-tensioned condition and then subsequently placed under operating tension and so maintained by a simple operation.

Other objects of my invention will become apparent from the following description taken in connection with the accompanying drawing in which Figure 1 is a side view of a portion of a brake assembly showing structure embodying my invention; and Figure 2 is a sectional view taken on the line 2—2 of Figure 1.

Referring to the drawing in detail, I have shown my invention associated with one end of a retracting spring for the two shoes of a cam-actuated brake but it is to be understood that this is for purposes of illustration only as my invention may be employed in other types of brakes having differently arranged retracting springs for the brake shoes. Also, it may be associated with both ends of a retracting spring. As shown in Figure 1, the brake assembly, which is of well-known construction, comprises two brake shoes 1 and 2 mounted on a backing plate 3 and positioned within the drum 4 for cooperation with the internal surface thereof. The brake shoe 1 is formed with a web 5 and a lining carrying flange 6 to which is secured a lining 7 for frictional engagement with the drum. The brake shoe 2 is of similar construction having a web 8 and a lining carrying flange 9 to which is secured the lining 10. Between the adjacent ends of the shoes there is mounted a cam 11 carried by a cam shaft 12 journaled in the backing plate. When this cam shaft is rotated in a counterclockwise direction, the cam will spread the shoes apart and force them into engagement with the drum for establishing a braking action. In order that the shoes may be retracted from the drum when the cam is returned to its "off" position, there is provided a retracting spring 13.

In prior known constructions this retracting spring has been constructed to be directly attached at its ends to the shoes, each attaching means generally comprising a hooked end hooked through a hole in a shoe. Since the retracting spring in large brakes such as truck brakes must be of considerable strength to return the brake shoes to their "off" position as determined by the "off" position of the cam, considerable difficulty has been experienced in assembling the spring in operative position, that is, hooked to both shoes and under tension when the shoes are retracted. In assembling this spring it is necessary to hook one end into the hole of one of the shoes and then simultaneously stretch the spring and hook it into the hole of the other shoe. This was quite difficult when performed either by hand or a tool due to the force necessary to stretch the fairly strong spring.

In accordance with my invention I have eliminated this difficulty by the provision of a special connecting means between one end of the retracting spring and the shoe (shown as shoe 2) to which it is attached. The other end of the retracting spring is shown as attached by an eye 14 and a pin 15 to the other shoe (shown as shoe 1) although the hook and hole connection may be employed if desired. As shown in Figures 1 and 2, the improved connecting means comprises a specially constructed lever 16 for association with one end of the spring and shoe 2. This lever has a portion 17 which is journaled in web 8 of shoe 2 and a second portion 18 at right angles thereto and lying in a plane parallel and adjacent the web. A third short integral portion 19 extends at right angles to portion 18 and parallel to the axis of journaled portion 17 and a fourth integral portion 20 of substantial length extends at right angles to portion 19. This portion 20 also lies in a plane substantially parallel to portion 18 and at substantially a right angle to this latter portion. The lever is held on the web by a cotter-key 21. The short portion 19 of the lever has the end of the retracting spring connected thereto by an eye 22.

The relationship between the different portions of the lever and the point at which said lever is journaled on the shoe is such that when arm 20 is in a position wherein the end thereof lies below the pivotal axis and engages flange 9 of the shoe, the retracting spring will be stretched and in its operative position. This position is shown in full lines in Figure 1. Under these conditions the line of pull of the spring will be above the pivotal axis of the lever and will tend to rotate said lever in a counter-clockwise direction. Such rotation, however, will be prevented due to the engagement of the end of portion 20 with the lining carrying flange. Thus, the tension of the spring locks the lever in this position. In other words, the arrangement of the lever is such that when the lever is rotated in a counter-clockwise direction and brought to the position shown in full lines in Figure 1, the pull of the spring will be transferred from one side of the pivotal axis of the lever to the other side so that it pulls the lever in a counter-clockwise direction instead of in a clockwise direction and holds the lever in a position so the spring will be stretched. If desired, a slight protuberance 23 may be placed on the flange surface with which the end of arm 20 can contact when being pulled by the spring.

If lever 16 should be rotated in a clockwise direction from the full line position shown in Figure 1 to the position shown in dotted lines, the first movement of the lever will result in spring 13 being additionally tensioned. However, after the lever assumes a position where the pull of the spring is on the side of the pivotal axis of the lever opposite that shown in full lines in Figure 1, the tension of the spring will quickly swing the lever around to the position shown in dotted lines. This brings the short arm 19 to which the end of the spring is attached from the side of the pivotal axis adjacent the shoe flange to the side of the axis toward the spring. Thus, the spring will be permitted to return to a non-tensioned or normal condition. With no tension on the spring, eye 14 can be easily disconnected from pin 15 on shoe 1.

In installing the spring and placing it in an operative condition under tension the end with eye 14 will be first connected to shoe 1 while the lever is in the position shown in dotted lines. The spring is next placed under tension by rotating the lever in a counter-clockwise direction to the position shown in full lines in Figure 1 where said lever will be maintained under all conditions by the pulling force of the spring.

From the above description it is seen that I have provided a very simple connecting means between one end of a retracting spring and a brake shoe whereby the spring can be quickly assembled or preloaded. The construction permits very rapid assembly and disassembly of the retracting spring. By employing my simple means for attaching and detaching the spring, a considerable saving of time results, especially when it is necessary to remove the shoes for relining or for any other purpose.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a brake shoe, a retracting spring therefor, and means for placing said retracting spring under tension comprising a pivoted member, means for connecting one end of the spring to said member at a point radially spaced from the pivotal axis thereof, and a stop for limiting the rotation of said pivoted member in one direction, said stop being so positioned that the member when rotated from a position where the point of connection between the end of the spring and the member is on that side of the pivotal axis of the member adjacent the body of the spring to a position engaging the stop the spring will be tensioned and the line of pull of the spring will be such in relation to the pivotal axis of the member as to hold the member against the stop and prevent its reverse rotation.

2. In braking apparatus, a brake shoe, a retracting spring therefor, means for placing said retracting spring under operating tension comprising a pivoted member, means for connecting one end of the spring to said member at a point radially spaced from the pivoted axis thereof to thus permit said spring to be tensioned by the rotation of said member, and a stop engageable by said member for limiting the rotation thereof in the direction to tension the spring but not interfering with reverse rotation of said member to untension said spring, said stop being so positioned that when the member is rotated to engage the stop the spring will be placed under tension and the moment of force of the spring with respect to the pivotal axis of the member will be such that the member will be maintained engaged with the stop.

3. In braking apparatus, a brake shoe, a retracting spring therefor, means between one end of the spring and the shoe for connecting the end to the shoe and for placing the spring under operating tension, said means comprising a member pivoted on the shoe, means for connecting the one end of the spring to the member at a point radially spaced from its pivotal axis, and a stop on the shoe for limiting the rotation of the member in one direction, said stop being so positioned that when the pivoted member is rotated from a position where the spring is not under tension to a position engaging the stop the spring will be tensioned and the line of pull of the spring will be such in relation to the pivotal axis of the member that the member will be held against the stop and prevented from reverse rotation.

4. In braking apparatus, a brake shoe, a retracting spring therefor, means for anchoring one end of the spring, means between the other end of the spring and the brake shoe for connecting said spring to the shoe and for placing the spring under tension, said means comprising a lever pivoted to the shoe, means for connecting said other end of the spring to the lever at a point radially spaced from the pivotal axis thereof, and a stop on the shoe for limiting the rotation of the lever in one direction, said stop being so positioned that the lever when rotated from a position where the point of connection of the spring is on the side of the pivotal axis toward the body of the spring to a position where the lever engages the stop the spring will be tensioned and a moment of force will be established by the spring which will be such as to hold the lever against the stop and maintain the spring tensioned.

5. In braking apparatus, a brake shoe, a retracting spring therefor, means for anchoring one end of the spring and means for connecting the other end of the spring to the shoe and for placing said spring under operating tension, said last named means comprising a lever pivoted to the shoe and having a short arm extending radially from the pivotal axis thereof and a longer arm, means for connecting the said other end of the spring to the short arm, and stop means on the shoe for engagement by the longer arm to limit rotation of the lever in one direction, said long arm and short arm being so related that when the lever is rotated to a position where the long arm engages the stop the spring will be tensioned and its line of pull on the short arm will be such in relation to the pivotal axis of the lever as to hold the long arm engaged with the stop.

6. In braking apparatus, a brake shoe having a web and lining carrying flange, a retracting spring therefor, means for anchoring one end of the spring and means for connecting the other end of the spring to the shoe and for placing said spring under operating tension, said last named means comprising a lever pivoted to the web of the shoe inwardly of the flange and having a short arm extending radially from the pivotal axis thereof and a longer arm capable of engaging the shoe flange to limit rotation of the lever in one direction, and means for connecting the said other end of the spring to the short arm, said long arm and short arm being so related that when the lever is rotated to a position where the long arm engages the flange the spring will be tensioned and its line of pull on the short arm will be such in relation to the pivotal axis of the lever as to hold the long arm engaged with the flange.

7. In braking apparatus, two brake shoes having retracted positions, a retracting spring therefor, means connecting one end of the spring to one shoe and connecting and tensioning means between the other end of the spring and the other shoe, said last named means comprising a member pivoted on the second shoe, means for connecting the said other end of the spring to said member at a point spaced from the pivotal axis thereof, and a stop on the second shoe for limiting the rotation of said member in one direction, said stop being so positioned that when the member is rotated to engage the stop the spring will be tensioned and the moment of force of the spring with respect to the pivotal axis of the member will be such as to hold the member engaged with the stop and the spring tensioned.

8. In braking apparatus, two brake shoes each provided with a web and a lining carrying flange and having a retracted position, a coil retracting spring therefor, means detachably connecting one of the springs to the web of one shoe, connecting and tensioning means between the other end of the spring and the other shoe, said last named means comprising a lever pivoted on the web of the second shoe inwardly of the flange and having a short arm extending radially from the pivotal axis thereof and a longer arm capable of engaging the flange to limit rotation of said lever in one direction, and means for connecting said other end of the spring to the short arm, said short arm and long arm being so related that when the lever is rotated from a position where the spring is not under operative tension to a position where the long arm engages the flange the spring will be tensioned and a moment of force will be established with respect to the pivotal axis which will act to hold the long arm engaged with the flange and the spring tensioned.

WERNER F. BOLDT.